United States Patent

[11] 3,576,387

| [72] | Inventor | Marshall J. Derby<br>Topsfield, Mass. |
|---|---|---|
| [21] | Appl. No. | 21,190 |
| [22] | Filed | Mar. 19, 1970 |
| [45] | Patented | Apr. 27, 1971 |
| [73] | Assignee | Chomerics, Inc.<br>Woburn, Mass.<br>Continuation-in-part of application Ser. No.<br>731,418, May 23, 1968, now abandoned. |

[54] HEAT SHRINKABLE ELECTROMAGNETIC SHIELD FOR ELECTRICAL CONDUCTORS
30 Claims, 3 Drawing Figs.

[52] U.S. Cl. .................................................. 174/36,
174/102SC, 174/DIG. 8, 156/49, 252/511
[51] Int. Cl. ........................................................ H01b 11/06
[50] Field of Search ............................................ 174/35,
35.2, 36, 102.2, (Digest 8), 110.43, 84; 156/49
(Inquired); 252/511

[56] References Cited
UNITED STATES PATENTS

| 3,140,342 | 7/1964 | Ehrreich et al. ............... | 174/35(.2) |
| 3,253,618 | 5/1966 | Cook............................ | 174/Shrink |
| 3,329,764 | 7/1967 | Tanges, Jr. .................... | 174/36X |

FOREIGN PATENTS

| 770,206 | 3/1957 | Great Britain................ | 174/102(.2) |

*Primary Examiner*—Darrell L. Clay
*Attorney*—Dike, Thompson & Bronstein

ABSTRACT: A heat-shrinkable article comprising a hollow tube of a heat-shrinkable material and a thin layer bonded to and conforming to a surface of the tube, said layer comprising a flexible and resilient polymeric material having electrically conductive particles dispersed therethrough. The heat-shrinkable article is useful as an electromagnetic shield when shrunk over an insulated electrical conductor.

PATENTED APR 27 1971  3,576,387
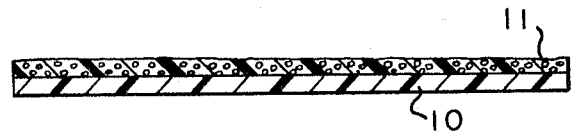
FIG.-1-
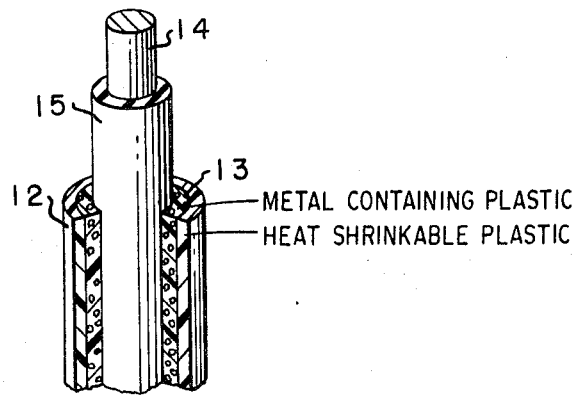
FIG.-2-
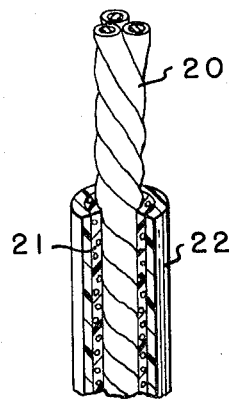
FIG.-3-
INVENTOR.
MARSHALL J. DERBY
BY
Armand P. Boisselle
ATTORNEY 3,576,387

HEAT SHRINKABLE ELECTROMAGNETIC SHIELD FOR ELECTRICAL CONDUCTORS

This application is a continuation-in-part of application Ser. No. 731,418, filed May 23, 1968 now abandoned.

BACKGROUND OF THE INVENTION

This invention relates to electromagnetic radiation shields and more particularly, to tubular articles comprising a hollow tube of heat-shrinkable material covered in part with a thin layer of a flexible and resilient electrically conductive polymer.

It has long been known to coat current carrying cables with an insulative material to isolate electric current from the environment. For example, such insulation prevents undesirable shorting or grounding of the wire cable. Where it is desired to have an electrical connection, the insulation can be stripped from the wire. While such coatings are effective as electric shields or insulators, they are not effective as insulators of electromagnetic energy. As electrons move from one place to another, an electromagnetic field is created which radiates outwardly from the point of generation, and this field influences the electrons in any conducting material within its field. It is important, therefore, to be able to contain the electromagnetic field within its source, and to prevent spurious electromagnetic energy from affecting other systems by permeating normal electrical insulation.

Electronic equipment has been shielded by totally enclosing the equipment in a metal "container" or housing that is continuously conductive, with no discontinuities in its seams or doors. The shielding of wires and cables has been accomplished in a similar manner by maintaining the wires and cables, with the electrically insulating coating, within metal pipes, the metal pipe providing the necessary shield. Such shields are extremely cumbersome since they are rigid and provide no flexibility to the system. A more flexible shielding conduit can be made of woven metal braid, stripped metal formed into spiral bellows or some other spiral that allows interlocking of adjacent strips. Although such conduits are more flexible than metal pipes, they are not sufficiently flexible for many applications, and they suffer the additional disadvantage of providing inferior shields of electromagnetic energy due to the leadage of electromagnetic energy through the breaks, joints, and other openings which are found in these types of conduits. This loss of shielding effectiveness increases as the frequency increases, and the shielding effectiveness is negligible at high frequencies.

In particular, it has been found that at frequencies in the range between 10 kHz. to 10 GHz. and particularly at frequencies in the GHz. region, with the aforementioned wire and cable type of shielding, it has not been possible to provide high attenuation characteristics, i.e., at least 30 db. and preferably at least 40 to 60 db. of attenuation which is required in the art.

The prior art has attempted to offer some newer types of tubular shielding wherein relatively thick layers of conductive plastic (about 20 mils or greater thickness) have been positioned and loosely bonded within heat shrinkable plastic tubing and then shrunk down over the wire or cable. It has been found that with thick layers of conductive plastic, cracking and discontinuities of the conductive layer has occurred during the shrinking process. This has resulted in a breakdown or leadage in shielding properties with the result that high attenuation characteristics cannot be achieved.

Applicant has himself found that even when a thick conductive layer is strongly bonded to the shrinkable plastic, tubing cracking and discontinuities and separation of the layers occurred, producing articles with low attenuation characteristics after shrinking.

Applicant has also discovered that if the layer of conductive plastic is too heavily loaded with metal particles, the conductive plastic will not strongly bond to the heat shrinkable tubing with the result that after shrinking of the plastic tubing, cracking, flaking and discontinuities appeared in the conductive layer even if the conductive layer were made very thin. These discontinuities, flaking and cracking in the shielding layer again resulted in loss of shielding properties so that high attenuation properties could not be achieved.

Applicant has also discovered that if the conductive plastic is too lightly loaded with metal particles there is an unexpectedly sharp drop off or decrease (not a linear decrease) in the attenuation characteristics so that only about 10 db. or less of attenuation could be obtained.

SUMMARY OF THE INVENTION

To overcome the above deficiencies in the aforementioned prior art, and in view of applicant's own discoveries, applicant has provided a new and improved tubular electromagnetic shield, comprising a heat-shrinkable tube having a thin layer of flexible and resilient polymeric matrix containing a limited amount of metal particles and bonded thereto. The tubular shield of this invention is capable of providing over 30 db. of attenuation over a wide range of frequencies. In particular, this has been accomplished by providing a thin flexible and resilient conductive layer (polymeric matrix containing metal particles) which is bonded so strongly to the heat-shrinkable tube (either to the inside or outside thereof) that it is not removable (separable) as an integral layer even after shrinking of the tube.

When the tubular shield is placed around an insulated wire or cable and heated, the heat-shrinkable material shrinks thereby providing a tight fit over the insulator. The now shielded wire or cable obtained in this manner is impervious to the elements of the atmosphere and provides a high degree of attenuation.

The cohesion between the molecules of the polymeric matrix is preferably less, and most preferably much less than the strength of the bond of the polymeric matrix to the tube.

BRIEF DESCRIPTION OF THE DRAWINGS

FIG. 1 is an enlarged transverse sectional view of the article of this invention before rolling into a tube.

FIG. 2 is a cutaway side view of a tubular article of the invention around a normally insulated wire or cable.

FIG. 3 is a cutaway side view of a bundle of insulated wires covered with a tubular article of the invention.

DESCRIPTION OF THE PREFERRED EMBODIMENTS

The articles of this invention comprises a first tubular member or wall of a heat-shrinkable material.

The tubular member is preferably of a thickness of from 1 to 100 mils, and most preferably of a thickness of about 3 to 25 mils. The heat-shrinkable material can be any of the known heat-shrinkable materials, e.g., thermoplastics such as the polyolefins (polyethylene, polypropylene, polystyrene, etc.) and suitable oriented polyesters, such as polyethylene terephthalate. The orientation of these thermoplastic compositions generally is accomplished by stretching the material at least 25 percent and up to 100 percent or more in the transverse or radial direction since lengthwise stretching would result in undesirable lengthwise shrinkage on heating. This stretching can be accomplished at room temperatures or at higher temperatures but below the fusion point of the polymeric material.

Orientation of polyolefins such as polyethylene generally comprises stretching the polyolefin either after, during, or before irradiation of the polyolefin with high energy electrons to cross-link the polyolefin. This orientation can also be exercised in connection with chemically cross-linked polyolefins. The polyethylene useful as a first member in the articles of this invention is a solid polymeric material formed by polymerization of ethylene at various temperatures and pressures. Such materials are described in "Modern Plastics Encyclopedia" 1968, New York 1967, pages 205—210. Specific examples of commercially available polyethylene are those sold by E.I. du Pont de Nemours & Co., Inc. Wilmington, Delaware, under the name of Alathon, and polyethylene sold by Phillips Petroleum Company, such as Marlax 20, 50, etc. Other polyethylenes which can be used in the practice of this invention and which may be prepared by either high- or low-pressure polymerizations, are described in U.S. Pat. Nos. 2,816,883 and 2,882,357.

In addition to the above-described thermoplastic polyethylenes, cross-linked polyethylenes, for example, polyethylene which is cross-linked to the substantially infusible and insoluble form, as for example, by irradiation with high energy electrons is also useful. A dosage of from about $4\times10^8$ rep to $5\times10^8$ rep is usually used for accomplishing this cross-linking. Moreover, the polyethylene may be chemically cross-linked, usually in situ, by means of a specific class or organic peroxides, such as dicumyl peroxide, in amounts ranging from about 0.1 to 10 percent of the weight of the polyethylene. The chemically cross-linked polyethylenes are described in U.S. Pat. Nos. 2,826,570 and 3,079,370.

Oriented polyethylene terephthalate is commercially available under the trademark Mylar from the E.I. du Pont de Nemours & Co., Inc. This commercially available film can be further oriented if it is uniaxially stretched in the range of 3 to 24 percent at room or elevated temperatures, and thereafter heated in the range of 25° to 150° C. for one-half hour. This postorientation procedure is described in U.S. Pat. No. 2,993,820. Both of these oriented polyethylene terephthalates exhibit great recovery when subsequently heated, and the postoriented material is especially useful where it is desired to have a material which exhibits an exceptionally high degree of shrinkage when heated.

The first tubular member of a heat-shrinkable material utilized in the articles of this invention may be in the form of a flat sheet which can be formed into a tube. The tube can be fabricated from a flat sheet of material simply by rolling it into a tube, forming a butt joint, and suitably sealing the seam. Where greater compressive forces are desired than those obtained by a single layer of the heat shrinkable material, the flat sheet can be rolled into a tube in such a manner that a series of spirally wound layers are formed whereby the compressive forces exerted by the wound layers on the second member are substantially greater than those exerted by a single layer of the shrinkable material. Such applications may require that the second member extend beyond the end of the first member in order to obtain a continuously conductive inner layer when the sheet is rolled into a tubular shape.

In its most preferred form the tubular member or wall is formed by extrusion or molding techniques and in any event is constructed (stretched) using conventional techniques so that it is adapted to shrink in the presence of applied heat from an original inside diameter $D_o$ (unshrunk condition) to a minimum or final inside diameter $D_f$. The ratio of $D_o/D_f$ is defined as $S_r$ (shrink ratio) and for the purposes of this invention and in order to preserve the properties of the second tubular member or wall bonded thereto is preferably limited to values no greater than about 7, preferably between 7 and 1.1 and most preferably is between 6 to 1.5. The criticality of the above is to be discussed later in this application.

In general the inside tube diameter can vary over a wide range depending on its application, but generally the tube will have an inside diameter $D_o$ of about 1 inch for wire and cable applications and inside diameter $D_o$ of about 4 inches or less in applications where the tube is made into a boot. The final diameter $D_f$ will naturally depend upon the amount of shrinkage imparted in the tube in fabricating it, but normally for wire applications the final inside diameter $D_f$ will be about one-fourth to one-fifth $D_o$ and where the shield is used as a boot, the final inside diameter $D_f$ will be about one-half to three-fifths $D_o$.

Bonded to the inside or outside of the first tubular member or wall is a second tubular member, wall, or layer of a flexible and resilient polymeric material of an initial thickness $T_m$ and containing conductive metal particles. The volume amount (percent) of metal particles in the matrix is critical in that if too much of the metal particles are used, poor and unsatisfactory bonding properties result and separation, peeling and cracking of the second member occurs after the first member has been shrunk thereby producing poor attenuation characteristics. On the other hand if too little (volume percent) of the metal particles are used, there appears a sharp deterioration in attenuation characteristics e.g. from 30 db. attenuation to less than about 10 db. attenuation. It has been found that if more than about 40 volume percent of the metal particles are used, unsatisfactory bonding occurs and if less than about 20 volume percent of the metal particles are used unsatisfactory attenuation properties result. For consistently good bonding and attenuation characteristics, it is preferable that 25 to 35 volume percent of the metal particles be utilized. It has also been found that the metal particles utilized should preferably not have a maximum dimension more than $0.7T_m$ to insure a strong polymeric matrix to first member bond. Most preferably, the metal particles should be of a maximum dimension on the average between $0.1\mu$ to $10\mu$ so as to achieve uniformly good bonding and high conductive properties. Most preferably the metal particles are selected from the noble metals (e.g. silver) to obtain high conductivities in the layer.

In constructing the tubular heat-shrinkable shield of this invention, it has been discovered that to provide consistently strong bonding, and at the same time high attenuation characteristics, the initial thickness $T_m$ should be no thicker than about 0.5 to 1.5 mils for a shrinkage ratio ($S_r$) of 7 and should be no thicker than about 9 to 10 mils for a shrinkage ratio of 1.1. It has been discovered that consistently high attenuation properties, along with exceptionally high bonding can be achieved if $$S_r \times T_m = \frac{D_o}{D_f} \times T_m$$

is always between about 0.5 and 20 in mils, and is preferably between 0.5 to 7 and is most preferably between 1 to 3.5 with the proviso that $T_m$ should be no thicker than about 10 mils at low $S_r$ values, or no thinner than about 0.5 mils at high $S_r$ values.

It is most preferable that for high shrink ratios that the thickness ($T_m$) be small and at low shrink ratios, the thickness be larger, with the added proviso that the layer thickness $T_m$ should always be thick enough so that when the tube is shrunk, the conductivity should be high enough to provide high attenuation as previously defined. It has been found that for the range of $D_o$'s up to about 4 inches, with the aforementioned shrink ratios, that the layer should have a resistance of about 150 ohms/foot maximum and for a recovered (shrunk) product a maximum resistance of preferably no more than about 5 ohms/foot. The resistance is measured by taking the article before and after shrinking the placing the two probes of an ohmmeter at either end of the tube against the conductive layer.

Most preferably, the resistance after shrinking is no more than about 1.5 ohms/foot to obtain high attenuation characteristics.

With the article constructed as in this invention, the resistance of the layer substantially decreases as the layer is compacted by shrinking the heat shrinkable tube. In fact, with a 1 inch $D_o$ tube, it is possible to decrease the initial resistance from 150 ohms to about 1.5 ohms after shrinking to a diameter $$D_f = \frac{D_o}{0}$$

It should be understood that the initial resistance of the conductive layer may be higher for high $S_r$'s and should be lower for low $S_r$'s in order to achieve a resistance after shrinking of no more than 5 ohms.

The term "polymeric matrix" is intended to include resins and elastomers as well as conventional plastics, such as polyolefins. The polymer can be thermosetting or thermoplastic. Asphalts, polyurethanes, polyesters, polyacrylates, polyamides, natural rubber, polyvinyl chloride, and silicones are examples of suitable matrices. The polymers can be either liquids or gums prior to curing, and depending upon the particular polymer, the curing can be effected by catalysts or by heating. Particularly preferred matrices include polyvinyl chloride plastisols, the room temperature curing silicon polymers, and the polyolefins. A butadiene polymer blocked by reaction with styrene is an example of a particular elastomer which can be filled with the metal particles of the invention and utilized in the preparation of the articles. This copolymer is available from the Shell Oil Company under the trade designation Thermolastic 125. A variety of silicone rubber gum stocks are available from the Dow Corning Corporation under the general trade name Silastic. These resins are dimethyl polysiloxanes with vinyl, phenyl, methyl and trifluoropropyl groups attached thereto to modify the properties of the gums. Recommended curing agents include peroxides such as benzoyl peroxide, dicumyl peroxide, and di-tert-butyl peroxide.

Room temperature vulcanizing silicon rubber compounds which are liquids or pastes that cure upon the addition of a curing agent to strong, durable, resilient silicone rubbers are available from the Silicon Products Department of General Electric under the general designation of RTV Silicon Rubber. These silicone rubbers are also of the methyl phenyl type. Suitable curing agents include tin octoate, dibutyl tin dilaurate, and lead octoate. As mentioned above, the electrically conductive powders which are incorporated into the polymeric matrix have a continuous outer surface of metal. Such powders can be preferably solid metal particles or nonmetal particles which have been coated with a metal. Examples of nonmetal particles include glass beads as well as hard polymeric substances such as epoxy resin beads. These nonmetal particles can be coated with the desired metal by any of the well-known processes. Examples of suitable metals which can be used to coat the nonmetal particles or as the solid metal particles include aluminum, nickel, lead, zinc, cadmium, copper, iron and the noble metals such as silver or gold. Alloys of such metals can also be used.

Because of the oxide coating problem, it is preferred to use particles that have an outer surface at least of a noble metal. These particles can be solid noble metal particles, nonnoble metal particles overcoated with a noble metal coating, or nonmetallic particles overcoated with a noble metal coating with or without an intermediate coating of a nonnoble metal. The preparation of silver-plated copper powders is described in U.S. Pat. No. 3,202,488. Copper-plated iron powders as such, or silver coated, can be incorporated into the polymeric matrix to provide a composition which is electrically conductive, electromagnetic energy shielding, and a magnetic shield. The preparation of such silver-plated powders is described in copending application Ser. No. 227,755, filed Oct. 2, 1962 now abandoned, and assigned to the same assignee as this invention.

The particles having an outer surface of the metal can have any shape including rodlike, granular, spherical, generally spherical, or planar. The nonplanar particles, especially those having a granular or generally spherical shape, are preferred because such particles provide better contact between the particles as well as the surfaces contacted, and these particles have been found to provide more effective electromagnetic energy shielding over a broad spectrum of wave lengths, including the higher frequencies. Moreover, the use of such nonplanar particles permits higher weight loadings of the metal without destroying the workability of the polymer matrix.

In addition to the electrically conductive powders, the polymeric matrix can also contain fillers to increase the strength and other properties of the resulting second member. Properly selected fillers also contribute to lower the cost by providing bulk without undesirable side effects. Fillers must be heat stable, fine particles, and chemically inert. Synthetic, fine-particle silicas are the most important reinforcing fillers and are commercially available.

The articles of this invention can be prepared by applying to a sheet or strip of the heat-shrinkable material, a coating of the flexible and resilient polymeric material containing the electrically conductive powders. This second member can be applied by any known method such as knife coating and roller coating, or spraying. Alternatively, the metal-containing polymer can be poured over the heat-shrinkable first member and thereafter cured or hardened. The particular method of application is not critical but is determined by the consistency of the metal-filled polymer and the desired thickness of the coating. The consistency or the viscosity of the metal-filled polymer prior to application to the heat-shrinkable first member can be reduced by known methods, such as by heating or by diluting with solvents. Suitable solvents include the organic solvents. Suitable solvents include the organic solvents such as toluene and xylene which have been found particularly useful. Evaporation of the solvent and/or curing of the polymer after it is applied to the first member of the article results in the formation of an electrically conductive flexible and resilient coating which can be either tightly or loosely bonded to the first member depending on the nature of the polymeric matrix. Selection of adhesive-type polymeric matrices results in tighter bonds.

FIG. 1 represents an enlarged transverse sectional view of the article of this invention. A flat sheet or strip of a heat-shrinkable material 10 is coated on one side with a metal-filled material 10 is coated on one side with a metal-filled polymeric substance 11. The second member can be of any desired thickness within the range previously given. Such thin layers are found to be adequate to provide the necessary electrical conductance and electromagnetic energy-shielding properties.

As mentioned earlier, tubular articles can be prepared in accordance with this invention from tubes which are extruded, molded, or fabricated from a sheet. It is preferred that such tubular articles be prepared by first preparing a tube of the heat-shrinkable first member by extrusion or molding, or any known method, and thereafter coating the inside of the tube with the second member. The method used to coat the first member is not critical. Such internal coating can be accomplished, for example, by filling the tube with the metal-filled polymer and allowing the excess polymer to flow out of the tube leaving a continuous film of the polymer within the tube. Alternatively, the polymer may be poured slowly into the tube while rotating the tube at an angle to insure that the polymer contacts the entire inner surface leaving whatever polymer adheres to the tubular first member. Additionally, the polymer may be sprayed into the tube if it is of a small enough dimension. For applications requiring a second member of added thickness, the pouring and turning procedure can be repeated until the desired thickness is obtained, or a more viscous metal-filled polymer can be utilized.

The following examples illustrate the articles of the invention. Unless otherwise indicated, all parts are by weight.

EXAMPLE 1

A polymeric mixture is prepared from 20 parts of General Electric's SR—585 Adhesive, a pressure-sensitive, low molecular weight silicon polymer available as a 50 percent by weight dispersion in toluene, 80 parts of a silver-plated copper powder (granular) prepared in accordance with the procedure described in example 1 of U.S. Pat. No. 3,202,488 (having an average particle size of 2—3 mils) and 30 parts of toluene. This mixture is poured into a conventional heat-shrinkable polyethylene tube approximately 30 cm. in length, and about 2.5 cm. in diameter with a wall thickness of approximately 0.1 cm. The tubing is turned slowly as the metal-filled adhesive moves toward the opposite end of the tubing until all of the interior of the polyethylene outer wall is coated with the mixture. Turning of the tubing is continued until the toluene has evaporated leaving a flexible and resilient elastomeric coating on the inside of the tubing. This elastomeric coating is found to be electrically conductive.

A wood spatula handle is placed within the tubing prepared above, and the tubing is heated to effect shrinkage. The diameter of the tubing is reduced to about 1.5 to 2 centimeters, and the resistance, measured by placing the probes of a volt ohmeter 9 cm. apart is observed to be 0.4 ohms. This value is essentially constant throughout the tube.

EXAMPLE 2

The procedure of example 1 is repeated except that the polymeric mixture comprises 13.7 parts (solids) of the SR-585 Adhesive, 71.8 parts of the silver-plated copper powder, and 14.5 parts of toluene. The film deposited in this manner contains 16 percent of the adhesive and 84 percent of the powder, has a thickness of about 10 mils, heat shrinks to 54 percent of its original dimensions, and has a resistance over a one foot span, prior to shrinking, of 2 ohms.

EXAMPLE 3

A strip of oriented Mylar (polyethylene terephthalate) 3 cm. × 30 cm. is knife coated on one side with a polymeric mixture comprised of 76 parts of silver flake (Handy and Harmon, Sil Flake 135) in 22 parts of a liquid silicone rubber available from the General Electric Company under the designation RTV-615A and two parts of a curing agent identified by General Electric as RTV-615B. The metal-filled polymeric coating is cured at room temperature and is found to be electrically conductive. The coated strip is wound around an insulated electric wire with the polymer coating on the inside. Heat is then applied to shrink the outer layer of the strip and force the inner polymer coating into contact with the insulation. The electric wire prepared in this manner is shielded from electromagnetic energy.

EXAMPLE 4

The procedure of example 3 is repeated except that the silver flake is replaced by 96 parts of a silver-copper-coated iron powder prepared in the manner described in copending application Ser. No. 227,755. The base iron powder has a surface area of 70 square feet per pound, and an average particle diameter of about 3 mils. It is first replacement coated with 18 mole percent copper from a copper sulphate solution, and then 12 mole percent of the copper is replaced with silver from a silver cyanide solution. The silver-coated powder in loose form has a volume resistivity under 0.5 ohm per centimeter as measured by probes from a volt ohmmeter.

EXAMPLE 5

The procedure of example 1 is repeated except that the polymer mixture comprises 85 parts of the silver-plated copper powder and 15 parts of a polybutadiene-styrene copolymer available from the Shell Oil Company under the designation Thermolastic 125 dissolved in 30 parts of toluene. The inner layer of the tubular article obtained in this manner exhibits excellent electrically conductive properties and shields electromagnetic energy.

FIG. 2 illustrates the product obtained when the tubular article of this example is placed around an insulated cable and thereafter heated to shrink the article around the insulated cable. The tubular article comprises an outer layer of a heat shrinkable polyethylene 12 and an inner layer of the metal-filled polybutadiene-styrene copolymer 13. The insulated cable comprises a core of electrically conductive wire or cable 14 and an insulating coating 15.

FIG. 3 illustrates the product obtained when the insulated cable 14 and 15 is replaced by a bundle of insulated wires 20. It should be recognized that the shape of the insulated cable is not critical and it could be flat as well as circular. The tubular article comprises an inner layer of conductive material 21 and an outer layer of heat-shrinkable material 22.

EXAMPLE 6

Spherical copper powder having an apparent density of 5.0 to 5.5 as determined on the Hall Flometer according to ASTM-B 212-48 is replacement plated with silver from a silver cyanide solution as described in example 1 of U.S. Pat. No. 3,202,488. The silver-plated copper powder obtained in this manner has an average particle size of about 10 to 15 mils. This powder (240 parts) is compounded with 53 parts of a dimethyl polysiloxane gum containing vinyl and phenyl groups available from Dow Corning under the name Silastic 440 Gum and 1.08 parts of 2,5-dimethyl-2,5-di(t-butyl peroxy) hexane by mixing in a Banbury mixer at room temperature for about 3 minutes. This mixture is then knife coated onto a sheet of a shrinkable polyethylene. This sheet can be used as is or cut into smaller strips. The sheet or strips are wrapped around insulated electric cables whereupon heat (170° C.) is applied to shrink the outer layer of polyethylene and cure the inner layer of metal filled silicone gum. Alternatively, the polyethylene can be heat shrunk at a lower temperature and the silicone cured by irradiation. Either way, the electric wires are provided with an electromagnetic energy shield.

EXAMPLE 7

A polymeric mixture is first prepared by mixing together 8.16 percent by weight of General Mills Versalon (polyamide resin), 42.80 percent by weight of Handy and Harmon Sil Flakes 135 (silver particle), and 24.52 percent by weight of toluene and 24.52 percent by weight of 1-propanol. The mixture is then poured into a 1-inch (inside diameter) tube as in example 1, or is sprayed on the inside of the tube using an artists air brush, of a heat-shrinkable polyethylene tube, the tube having a thickness of 3 mils and being 3 inches long. The tube is selected so that it is capable of being shrunk to about 25 percent of its original inside diameter.

The polymeric layer bonded to the polyethylene is permitted to accumulate to provide a thickness of 2.0 mils. The solvents toluene and 1-propanol are then permitted to evaporate.

EXAMPLE 8

Using the procedure of example 7, the following materials are added together to prepare the polymeric matrix:
12.1 percent General Electric SR-516 (Silicone resin), (50 percent solution) is toluene by weight;
33.7 percent by weight, Handy and Harmon Sil Flakes 135
54.2 percent by weight, toluene.
The tube is then prepared as in example 7.

As can be seen from the above examples the articles of this invention are particularly useful for providing electromagnetic and magnetic shields where flexibility is desired. These articles also are useful for providing proper grounds for electrical and electronic equipment due to the conductive nature of the second member. For example, where an insulated, current-carrying cable is stripped of its insulation to permit an electrical connection, it can be enclosed with the article of this invention to provide the desired electromagnetic energy shield, and the second member (conductive) can be connected to ground if desired. The articles of this invention, especially the tubular articles, can be utilized to provide means for connecting cables or wires together in such a way that there is tight, intimate and impervious bond and coating formed. Capacitors may also be enclosed in an electronic seal prepared by heat shrinking an article of this invention around a normal capacitor.

I claim:
1. An electromagnetic shielding article adapted to be shrunk comprising a first tubular wall of heat shrinkable plastic material and a second tubular wall of a flexible and resilient polymeric matrix having electrically conductive metal particles dispersed therein, said second tubular wall bonded to and conforming to the shape of the first tubular wall, said first tubular wall adapted to shrink in the presence of heat from an inside diameter $D_o$ to an inside diameter $D_f$, and said second tubular wall having an initial thickness $T_m$ before shrinking of the first tubular wall and wherein the produce of $D_o/D$ and $T_m$ in mils is between about 0.5 and 20, where $T_m$ is greater than or equal to about 0.5 mils and is less than or equal to about 10 mils, and wherein the polymeric matrix contains about 20 to 40 volume percent of conductive metal particles.

2. An article according to claim 1, in which the second tubular wall is bonded to the inside of the first tubular wall.

3. An article according to claim 1 in which metal particles are not larger than 0.7 $T_m$ in any dimension.

4. An article according to claim 3 in which the metal particles are selected from the class of noble metals.

5. An article according to claim 4, in which the metal particles are silver.

6. An article according to claim 1, in which the first tubular wall is substantially more shrinkable radially than lengthwise.

7. An article according to claim 1, in which the polymeric matrix contains 25 to 35 volume percent of conductive metal particles.

8. An article according to claim 1, in which the resistance of the second tubular wall is less than about 150 ohms per foot of length.

9. An article according to claim 8 in which the second tubular wall is bonded to the inside of the first tubular wall.

10. An article according to claim 9 in which the metal particles are less than 0.7 $T_m$ in their largest dimension, and in which the heat shrinkable material is a cross-linked polymer.

11. An article according to claim 10 in which the metal particles are silver and in which the second tubular wall is a polyolefin.

12. An article according to claim 10 in which the second tubular wall is selected from the class consisting of a polyamide resin, silicone resin and polybutadiene-styrene resin.

13. An article according to claim 12 in which the first tubular wall is polyethylene.

14. An article according to claim 9 in which the metal particles are silver and have a maximum dimension of 0.7 $T_m$ in any dimension.

15. An article according to claim 14 in which the second tubular wall is a polyamide.

16. An electromagnetic shielding article adapted to be shrunk comprising a first tubular wall of heat-shrinkable plastic material and a second tubular wall of flexible and resilient polymeric matrix having electrically conductive metal particles therein, said second tubular wall bonded to and conforming to the shape of the first tubular wall, the thickness of the second tubular wall being between 0.5 and 10 mils, the first tubular wall having a shrink ratio $S_r$ between 7 and 1.1, and the polymeric matrix contains between about 20 to 40 volume percent of conductive metal particles, in the above $S_r$ is defined as $D_o/D_f$ where $D_o$ is the original inside diameter of the first tubular wall and $D_f$ is the final inside diameter of the first tubular wall after article is shrunk.

17. An article according to claim 16 in which the resistence of the second tubular wall prior to shrink is less than about 150 ohms per foot of length.

18. An article according to claim 16 in which the second tubular wall is bonded to the inside of the first tubular wall.

19. An article according to claim 18 in which the second tubular wall is selected from the class consisting of polyamide, silicone and polybutadiene-styrene resins.

20. An article according to claim 19 in which the metal particles are silver and wherein the silver particles are less than seven-tenths the thickness of the second tubular wall in any dimension.

21. An article according to claim 16 in which the second tubular wall is bonded to the inside of the first tubular wall, and in which the first tubular wall is substantially more shrinkable radially than lengthwise.

22. An article according to claim 19 in which the polymeric matrix contains 25 to 35 volume percent of conductive metal particles.

23. An article according to claim 22 in which the second tubular wall is a polyamide resin and the metal particles are silver.

24. An article according to claim 19 in which the maximum dimension of the metal particles is $0.1\mu$ to $10\mu$ and wherein the particles are silver.

25. An article according to claim 24 in which the second tubular wall is a polyamide resin.

26. An article according to claim 25 in which the first tubular wall is polyethylene.

27. An electromagnetic shielding article adapted to be shrunk comprising a first tubular wall of heat-shrinkable plastic material and a second tubular wall of flexible and resilient polymeric matrix having electrically conductive metal particles therein, said second tubular wall bonded to and conforming to the shape of the first tubular wall, the thickness of the second tubular wall being between 0.5 and 10 mils, the first tubular wall having a shrink ratio $S_r$ between 7 and 1.1, and the polymeric matrix containing an amount of conductive metal particles with the second tubular wall prior to shrinking having a resistance of less than about 150 ohms per foot of length and, after shrinking having a substantially decreased resistance less than about 5 ohms per foot of length and an attenuation of not less than about 30 db. at frequencies in the range of between 10 kHz. to 10 GHz., the cohesion of the polymeric matrix being less than the strength of the bond of the first tubular wall to the second tubular wall, in the above $S_r$ is defined as $D_o/D_f$ where $D_o$ is the original inside diameter of the first tubular wall and $D_f$ is the final inside diameter of the first tubular wall after the article is shrunk.

28. An electromagnetic shielding article according to claim 27 in which the polymeric matrix contains about 20 to 40 volume percent of conductive metal particles.

29. An electromagnetic shielding article according to claim 27 in which the second tubular wall is bonded to the inside of the first tubular wall and the metal particles are silver.

30. An electromagnetic shielding article according to claim 29 in which the polymeric matrix is polyamide resin and in which the resistance of the second tubular wall after shrinking is less than 1.5 ohms per foot of length.